UNITED STATES PATENT OFFICE.

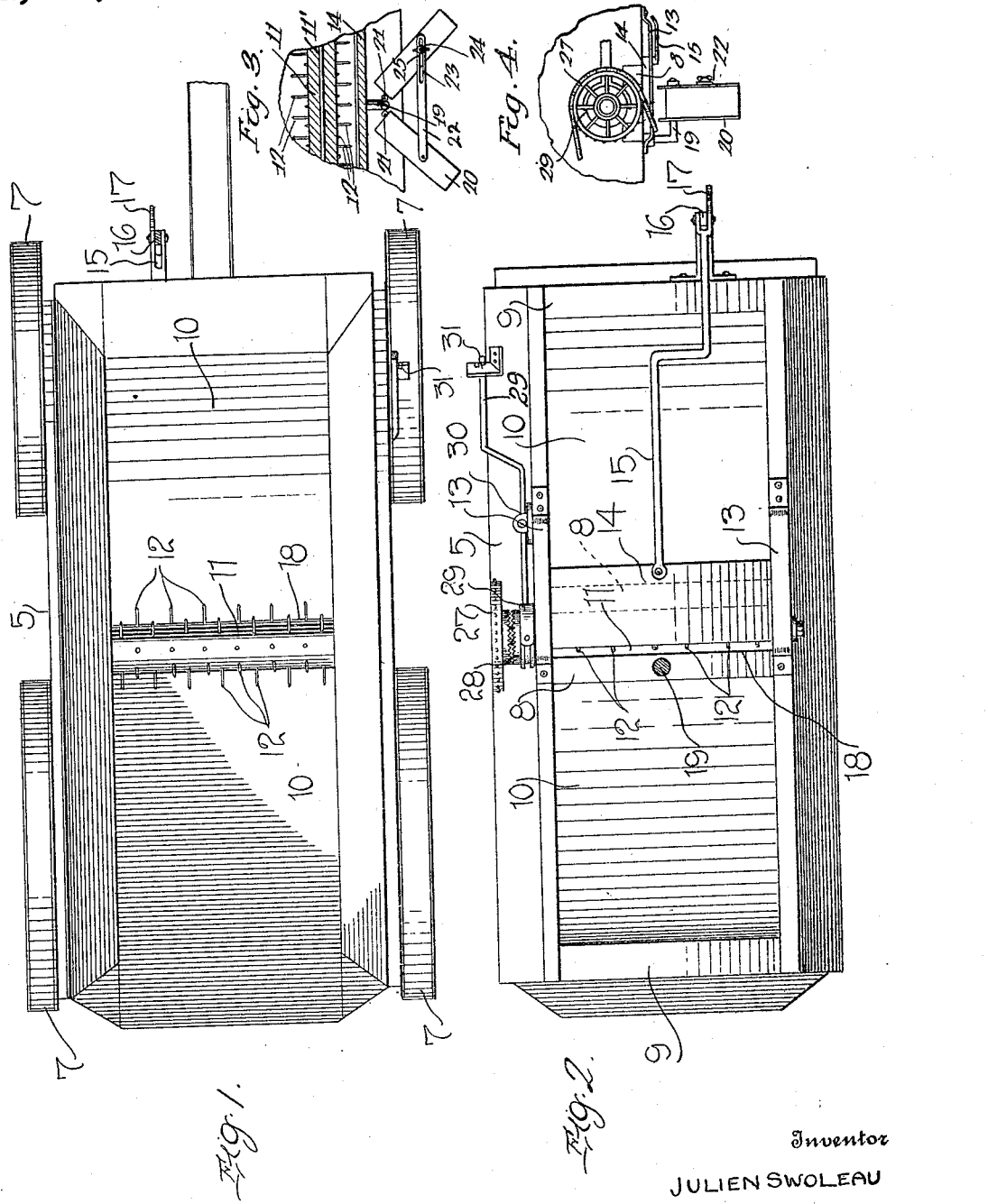

JULIEN SWOLEAU, OF DUSON, LOUISIANA.

MANURE-SPREADER.

1,137,924.  Specification of Letters Patent.  Patented May 4, 1915.

Application filed March 24, 1914. Serial No. 826,988.

*To all whom it may concern:*

Be it known that I, JULIEN SWOLEAU, citizen of the United States, residing at Duson, in the parish of Lafayette and State of Louisiana, have invented certain new and useful Improvements in Manure-Spreaders, of which the following is a specification, reference being had to the accompanying drawings.

This invention relates to manure spreaders and has for its primary object to provide means whereby the manure may be distributed in spaced rows, or scattered broadcast over the ground.

The invention has for another and more particular object to provide an improved adjustable directing or discharge chute arranged beneath the body of the spreader whereby the space between the rows of manure deposited upon the ground may be varied as desired.

The invention has for a further object to generally improve and simplify the construction of devices of the above character, and to increase their efficiency and reliability in operation without adding materially to the manufacturing cost thereof.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a top plan view of a manure spreader. Fig. 2 is a bottom plan view showing the feed controlling means. Fig. 3 is a detail side elevation illustrating the mounting of the discharge chutes; and Fig. 4 is a similar view looking at right angles to Fig. 3.

Referring in detail to the drawings, 5 designates the body of the spreader, which is secured in the usual manner upon axles 6 on the ends of which the supporting wheels 7 are revolubly mounted. This body includes spaced parallel side walls connected by intermediate transverse beams 8 and the end beams 9. The bottom of the body 5 consists of oppositely inclined plates 10, said plates converging toward each other from opposite ends of said body and being secured upon the intermediate and end beams 8 and 9. In the side walls of the body 5, between the spaced intermediate beams 8, the ends of the distributing roller 11 are journaled, said roller being provided with a plurality of agitating spurs 12 projecting from its periphery.

Upon the lower edges of the side walls of the body 5, longitudinally extending metal guide straps 13 are secured, and between said straps and the lower edges of the side walls, the ends of a longitudinally movable feed regulating plate 14 are disposed. This plate is provided with a central forwardly extending bar 15 which is connected to the lower end of a lever 16. This lever is mounted upon a rack segment 17 secured to the forward end of the body 5 and carries the usual spring-pressed dog for engagement with the teeth of the rack whereby said lever may be locked in its adjusted position. It will be apparent that by manipulating the lever 16, the plate 14 may be shifted longitudinally between the spaced beams 8 and the width of the outlet slot indicated at 18 varied accordingly so as to regulate the amount of manure discharged through said slot in the rotation of the agitating and distributing roller 11.

A rod 19 has one of its ends fixed centrally to the rear transverse beam 8 and extends longitudinally and forwardly therefrom. Upon this rod the adjustable directing chute 20 is arranged. This chute consists of two similar sections hingedly connected at one of their ends as at 21 to the rod 19 and extending upon opposite sides thereof. To one section of the chute 20, one end of a bar 22 is pivotally connected, the other end of said bar being provided with a longitudinal slot 23 through which a threaded stud 24 fixed to the other of the chute sections is disposed. Upon this stud a wing nut 25 is threaded. It will be obvious that by this construction, the sections of the chute 20 may be disposed at various inclinations with respect to each other and securely held in their adjusted positions by means of the bar 22 and nut 25. Thus the manure will be directed by the sections of the chute in opposite directions from the center of the body 5 and deposited in spaced rows upon the ground. By suitably adjusting the sections of the chute, said rows may be deposited at any desired distance apart.

It will be understood that suitable driving connections are provided between one of the ground wheels and the shaft of the feed roller 11 so that rotary motion is imparted to said roller in the movement of the machine.

From the foregoing description taken in connection with the accompanying drawings, it is thought that the construction, manner of operation and several advantages of my invention will be clearly and fully understood. By providing the adjustable chute 20, it will be understood that when the sections thereof hang down vertically from the longitudinal rod 19, the manure will be discharged through the outlet slot 18 and distributed broadcast over the ground as the machine moves across the field. When, however, it is desired to deposit the manure in spaced rows, the chute sections 20 may be very easily and quickly adjusted and secured in their adjusted positions, as above explained, so that the rows of manure may be deposited upon the ground at any desired distance apart. My invention as a whole is comparatively simple in its construction, and strong, durable and serviceable in practical use.

While I have shown and described the preferred construction and arrangement of the several elements employed, it will be understood that the invention is susceptible of considerable modification therein and I therefore reserve the privilege of resorting to all such legitimate changes as may be fairly embodied within the spirit and scope of the invention, as claimed.

Having thus described the invention, what is claimed is:

1. In a manure spreader, the combination with a body having a transversely extending discharge opening; of a horizontally movable feed controlling plate slidably mounted entirely beneath the bottom of the body and operating across the discharge opening, a longitudinally extending rod centrally arranged beneath the body and fixed at one of its ends thereto, the body of the rod being depressed below the level of the feed controlling plate to thereby permit of movement of the feed controlling plate across the space above the rod, said rod extending across the discharge opening, independently adjustable oppositely disposed chutes, each having a width equal to the maximum width of the discharge opening and having upwardly extending sides, and being pivotally mounted at their corresponding ends upon said rod, and chutes extending in opposite directions therefrom, whereby to deposit manure in spaced rows upon the ground, said chutes being movable from a position of angularity with respect to the bottom of the body, to a position parallel thereto.

2. In a manure spreader, a body having a discharge opening extending transversely thereto, a supporting member mounted at one end upon the bottom of the body and extending longitudinally of the body and beneath said opening, and oppositely disposed chutes hingedly mounted upon the supporting member for angular adjustment with relation to each other, said chutes being slidable off and on said supporting member.

In testimony whereof I hereunto affix my signature in the presence of two witnesses.

JULIEN × SWOLEAU.
his mark

Witnesses:
CLAIBUN AVANT,
AMEDE MOUTON.

Copies of this patent may be obtained for five cents each, by addressing the "Commissioner of Patents, Washington, D. C."